(12) United States Patent
Praharaj et al.

(10) Patent No.: US 11,192,299 B2
(45) Date of Patent: Dec. 7, 2021

(54) METHOD AND APPARATUS FOR IMPROVED SURFACE CURE FOR THREE DIMENSIONAL PRINTED PARTS

(71) Applicant: Xerox Corporation, Norwalk, CT (US)

(72) Inventors: Seemit Praharaj, Webster, NY (US); Mandakini Kanungo, Penfield, NY (US); Paul McConville, Webster, NY (US); Patrick Jun Howe, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 242 days.

(21) Appl. No.: 15/496,784

(22) Filed: Apr. 25, 2017

(65) Prior Publication Data

US 2018/0304548 A1    Oct. 25, 2018

(51) Int. Cl.

| | | |
|---|---|---|
| *B29C 71/04* | (2006.01) | |
| *B29C 64/10* | (2017.01) | |
| *B29C 64/135* | (2017.01) | |
| *B29C 64/20* | (2017.01) | |
| *B29C 35/08* | (2006.01) | |
| *B33Y 40/00* | (2020.01) | |
| *B29C 64/124* | (2017.01) | |
| *B29C 64/153* | (2017.01) | |
| *B29K 105/24* | (2006.01) | |
| *B29C 64/165* | (2017.01) | |

(52) U.S. Cl.
CPC .......... *B29C 64/20* (2017.08); *B29C 35/0805* (2013.01); *B29C 64/10* (2017.08); *B29C 64/124* (2017.08); *B29C 64/135* (2017.08); *B29C 64/153* (2017.08); *B29C 71/04* (2013.01); *B33Y 40/00* (2014.12); *B29C 64/165* (2017.08); *B29C 2035/0827* (2013.01); *B29K 2105/243* (2013.01)

(58) Field of Classification Search
CPC ..... B29C 64/124; B29C 64/153; B29C 64/10; B29C 64/20; B29C 64/135; B29C 71/04; B29C 35/0805; B29C 64/165; B29C 2035/0827; B29C 64/386; B29C 35/08; B29C 64/129; B33Y 40/00; B33Y 10/00; B33Y 50/00; B29K 2105/243
USPC .......................................... 264/497
See application file for complete search history.

(56) References Cited

U.S. PATENT DOCUMENTS

2002/0164069 A1 * 11/2002 Nagano ................. B29C 64/129
                                                        382/154
2005/0175925 A1 *  8/2005 Johnson .................. G03F 7/032
                                                        430/280.1

(Continued)

OTHER PUBLICATIONS

Steven P. DenBaars, Shuji Nakamura and James Speck, Ongoing LED R&D Challenges (LED droop still challenge), 2015, DOE Solid-State Lighting Workshop (Year: 2015).*

*Primary Examiner* — Abbas Rashid
*Assistant Examiner* — Caroline Beha

(57) ABSTRACT

A method for curing a three dimensional (3D) printed part is disclosed. For example, the method includes adding a layer of a build material, curing the layer of the build material using a first light source having a first wavelength, repeating the adding and the curing using the light source having the first wavelength for a predefined number of layers, adding a final top layer of the build material to form the 3D printed part and curing the final top layer of the build material using a second light source having a second wavelength that is different than the first wavelength.

11 Claims, 4 Drawing Sheets

(56) References Cited

U.S. PATENT DOCUMENTS

| | | | | |
|---|---|---|---|---|
| 2008/0315461 A1* | 12/2008 | Henningsen | ............ | B33Y 40/00 |
| | | | | 264/401 |
| 2009/0267269 A1* | 10/2009 | Lim | .................... | B29C 67/0059 |
| | | | | 264/401 |
| 2011/0195363 A1* | 8/2011 | Rock | ....................... | G03F 7/095 |
| | | | | 430/325 |
| 2012/0304449 A1* | 12/2012 | Jackson | ................ | B29C 64/106 |
| | | | | 29/527.1 |
| 2014/0348692 A1* | 11/2014 | Bessac | .................. | B22F 3/1055 |
| | | | | 419/53 |
| 2017/0120515 A1* | 5/2017 | Rolland | ................. | B33Y 10/00 |
| 2018/0264726 A1* | 9/2018 | Shiomi | ................... | B22F 3/105 |

* cited by examiner

METHOD AND APPARATUS FOR IMPROVED SURFACE CURE FOR THREE DIMENSIONAL PRINTED PARTS

The present disclosure relates generally to three dimensional (3D) printing and, more particularly, to a method and apparatus for improved surface cure for 3D printed parts.

BACKGROUND

Additive printing, also referred to as 3D printing, has emerged as an innovative manufacturing technology. 3D printing promises unprecedented benefits to manufacturers such as reduced cost of production and expedited development and customization.

3D printing operates by adding a layer of a build material in accordance with an outline or shape of the printed part. The layer may be cured, for example, by an ultra violet curing light. The process of adding build material and curing may be repeated layer by layer until the printed part is completed. The printing may be controlled by a computer.

SUMMARY

According to aspects illustrated herein, there are provided a method, non-transitory computer readable medium and apparatus for curing a three dimensional (3D) printed part. One disclosed feature of the embodiments is a method that adds a layer of a build material, cures the layer of the build material using a first light source having a first wavelength, repeats the adding and the curing using the light source having the first wavelength for a predefined number of layers, adds a final top layer of the build material to form the 3D printed part and cures the final top layer of the build material using a second light source having a second wavelength that is different than the first wavelength.

Another disclosed feature of the embodiments is a non-transitory computer-readable medium having stored thereon a plurality of instructions, the plurality of instructions including instructions which, when executed by a processor, cause the processor to perform operations that add a layer of a build material, cure the layer of the build material using a first light source having a first wavelength, repeat the adding and the curing using the light source having the first wavelength for a predefined number of layers, add a final top layer of the build material to form the 3D printed part and cure the final top layer of the build material using a second light source having a second wavelength that is different than the first wavelength.

Another disclosed feature of the embodiments is an apparatus comprising a processor and a computer-readable medium storing a plurality of instructions which, when executed by the processor, cause the processor to perform operations that add a layer of a build material, cure the layer of the build material using a first light source having a first wavelength, repeat the adding and the curing using the light source having the first wavelength for a predefined number of layers, add a final top layer of the build material to form the 3D printed part and cure the final top layer of the build material using a second light source having a second wavelength that is different than the first wavelength.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus for improved surface cure for 3D printed parts. As discussed above, 3D printing operates by adding a layer of a build material in accordance with an outline or shape of the printed part. The layer may be cured, for example, by an ultra violet curing light. The process of adding build material and curing may be repeated layer by layer until the printed part is completed. The printing may be controlled by a computer.

In traditional 3D printing a bottom layer may experience sufficient oxygen inhibition to cure the bottom layer completely. However, the top layer may remain only partially cured giving rise to a slimy or tacky surface having a foul odor. One solution may be to add a sacrificial layer over, or onto, the top layer. The sacrificial layer may be added and cured to ensure that the top layer is fully cured. Subsequently, the sacrificial layer may be removed. However, this may add printing costs due to the additional material used for the sacrificial layer and energy used for the additional curing. Furthermore, using the sacrificial layer may increase processing times due to the additional printing step, steps to remove the sacrificial layer and steps to clean the top layer. Another drawback to using the sacrificial layer is that the top layer can only have a matte finish.

Embodiments of the present disclosure provide a novel method for an improved surface cure of a top layer of a 3D printed part. The method of the present disclosure uses a combination of different wavelength lights for curing without using a sacrificial layer. As a result, the embodiments of the present disclosure ensure that the top layer is fully cured and can provide a glossy finish for the top layer.

Figure 1:
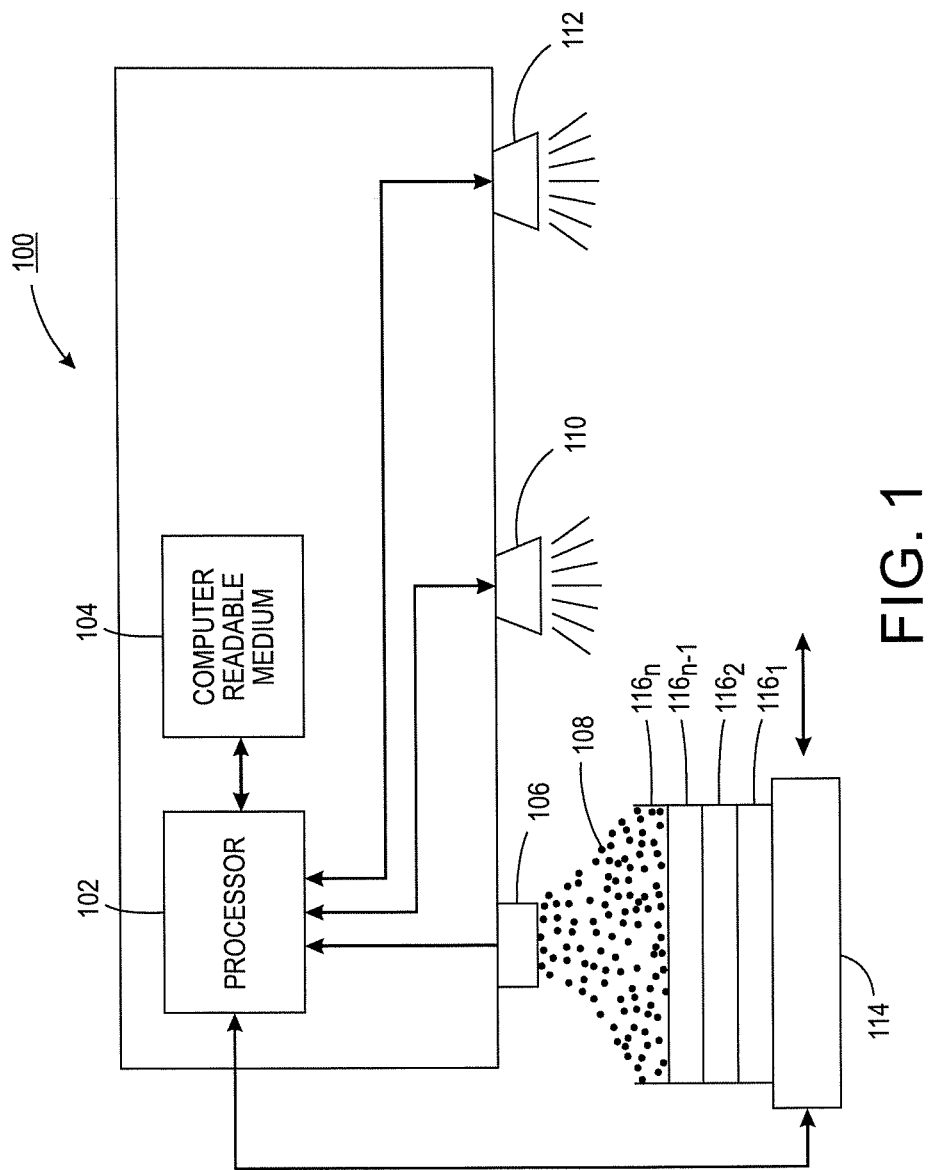
FIG. 1 illustrates a block diagram of an example 3D printer of the present disclosure.

FIG. 1 illustrates an example 3D printer 100 of the present disclosure. In one embodiment, the 3D printer 100 may include a processor 102 and a computer readable medium 104. The computer readable medium 104 may store instructions and stored parameters associated for a print job. The processor may execute the instructions and use the stored parameters to perform functions described herein. In one embodiment, the processor 102 and the computer readable medium 104 may be part of a separate computer system that executes a computer aided design (CAD) program that controls the 3D printer 100.

In one embodiment, the 3D printer 100 may include a dispenser 106 that dispenses a build material 108, a first light source 110, a second light source 112 and a movable platform 114. In one embodiment, the build material 108 may be a curable material. For example, the build material 108 may be small particles of metal, a plastic, a polymer, or an ultra violet (UV) curable ink.

In one embodiment, when the build material 108 is a UV curable ink, the 3D printer 100 may include a plurality of dispensers 106 for each one of a plurality of different colors. For example, the UV curable ink may be different colors such as cyan, magenta, yellow and black and the 3D printer 100 may include a respective dispenser 106 for each color.

In one embodiment, the first light source 110 and the second light source 112 may be UV light sources that operate at different wavelengths. For example, the first light source 110 may be a UV light source that operates between approximately 390 nanometers (nm) to 400 nm. In one embodiment, the first light source 110 may operate at 395 nm.

In one embodiment, the second light source 112 may be a UV light source that operates between approximately 360 nm to 370 nm. In one embodiment, the second light source 112 may operate at 365 nm.

The first light source 110 and the second light source 112 may operate at varying light intensity levels at the respective wavelengths of light. For example, the first light source 110 and the second light source 112 may operate anywhere from 15% intensity to 200% intensity of a normal operating light intensity value.

In one embodiment, the build material 108 may be dispensed onto the movable platform 114 to lay a first layer $116_1$ of the build material 108. The movable platform 114 may move along a two-dimensional axis beneath the dispenser 106, or the dispenser 106 may be moved along a two-dimensional axis over the platform 114. The build material 108 may be dispensed in accordance with a shape or outlined for a particular 3D printed part stored in the computer readable medium 104 and executed by the processor 102.

In another embodiment, the movable platform 114 may contain a bed of the build material 108. The outline of 3D printed part may be "printed" using a curable binder or liquid onto the bed of the build material 108. The build material 108 may be dispensed on top of the "printed" layer after the "printed" layer is cured.

The movable platform 114 may then move the first layer $116_1$ beneath the first light source 110. The first layer $116_1$ may be exposed to the light of the first light source 110 for a predefined amount of time (e.g., a several seconds or minutes) to cure the build material 108 of the first layer $116_1$. This process may be repeated for a predefined number of layers up to a layer $116_{n-1}$ (e.g., the layer immediately before or adjacent to a last top layer $116_n$).

After the predefined number of layers up to the layer $116_{n-1}$ have been cured, a final top layer $116_n$ may be dispensed. The movable platform 114 may move the stack of layers $116_1$ to $116_n$ under the second light source 112. The final top layer $116_n$ may be cured under the second light source 112 for a predefined amount of time (e.g., several second or minutes) to cure the build material 108 of the final top layer $116_n$. In some embodiments, the movable platform 114 may move the final top layer $116_n$ below the second light source 112 for several passes.

As a result, the 3D part comprising the plurality of layers $116_1$ to $116_n$ may be completed with a glossy finish. Notably, no sacrificial layer is applied on top of the final layer $116_n$ that is then cured and removed. In addition, it should be noted that the layers $116_1$ to $116_{n-1}$ are only exposed to the first light source 110 and that the final top layer $116_n$ is only exposed to the second light source 112. The combination of using the first light source 110 at a first wavelength on layers $116_1$ to $116_{n-1}$ and the second light source 112 at a second wavelength that is different than the first wavelength on the last top layer $116_n$ allows the 3D part to have a glossy finish without the need for a sacrificial layer or using excess energy or light.

Another advantage of using the second wavelength only on the last top layer $116_n$ may be that the intermediate layers (e.g., the layers $116_1$ to $116_{n-1}$) may not be fully cured when another layer 116 is added. This may give better interlayer adhesion resulting in a part that has better structural integrity.

Figure 2:
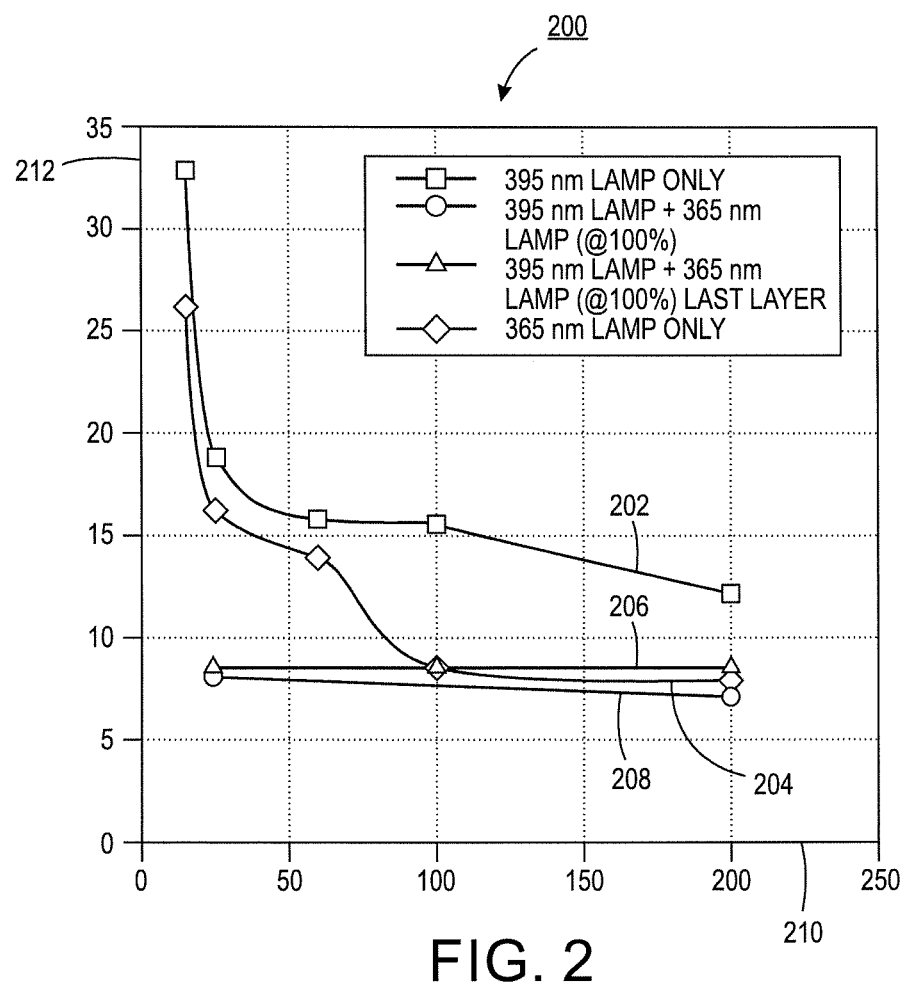
FIG. 2 illustrates an example graph illustrating percent intensity versus percentage uncured build material remaining.

FIG. 2 illustrates a graph 200 that illustrates the advantage of using the two different wavelengths to cure the 3D part. The x-axis 210 represents a light intensity percentage of the light sources that are used. The y-axis 212 represents a percentage of uncured build material. In one embodiment, to determine if the 3D part is fully cured, the completed 3D part may be weighted and then placed in a solution of terahydrofuran (THF). The THF may bond to any remaining uncured build material in the 3D part.

The 3D part may be taken out of the THF after 24 hours and put on an aluminum pan and basked at 75 degrees Celsius (° C.) for 24 hours to dry the sample. The dried 3D part may then be weighed to determine a weight loss from the initial weight of the 3D part. The uncured build material may be determined based on a percentage calculated by the weight loss of the 3D part divided by the initial weight multiplied by 100. A fully cured 3D part may have a percentage that is 8 or less.

FIG. 2 illustrates a first line 202 that represents curing a 3D part using only a single light source at 395 nm. At lower light intensities (e.g., approximately 15%) the completed 3D part remains uncured (e.g., having a percentage over 30). Even using higher intensity light output at 395 nm the 3D part can never fully cure as shown by four data points on the line 202.

A second line 204 represents curing a 3D part using only a single light source at 365 nm. At lower light intensities (e.g., approximately 15%) the completed 3D part remains uncured (e.g., having a percentage over 25%). The 3D part can become fully cured when the light source at 365 nm is used at 100% to 200% light intensity as shown by the data points on the line 204.

A third line 206 represents curing a 3D part using the embodiments of the present disclosure. For example, the 3D part is cured using the first light source 110 at approximately 395 nm for each layer up to the next to last layer (e.g., the layer $116_{n-1}$). The last layer (e.g., the last top layer $116_n$) may then be cured using the second light source 112 at approximately 365 nm. As shown by the third line 206, the 3D part can become fully cured (e.g., having a percentage of approximately 8 or less) even when emitting the 395 nm light and the 365 nm light at intensities as low as 15%. Increasing the intensity does not significantly increase the amount of curing as shown by the third line 206.

A fourth line 208 represents curing a 3D part using both the first light source 110 at approximately 395 nm and the second light source 112 at approximately 365 nm on each layer. In other words, each layer is cured with a combination of the light emitted at 395 nm and 365 nm. The fourth line 208 shows that the 3D part may be fully cured (e.g., having a percentage of approximately 8 or less) even when emitting the 395 nm light and the 365 nm light in combination at intensities as low as 15%. However, it should be noted that the improvement in curing is not substantial over using the second light source 112 at approximately 365 nm only on the last top layer $116_n$ as shown by the line 206.

Notably, operating the second light 112 source at approximately 365 nm is significantly more expensive than operating the first light source 110 at approximately 395 nm. Thus, the embodiments of the present disclosure provide a method that completely cures the 3D printed part while minimizing the use of the second light source 112 that operates at approximately 365 nm. In addition, the 3D printed part can be fully cured at lower light intensities using the embodiments of the present disclosure, which can also lead to additional efficiencies and cost savings.

Referring back to FIG. 1, it should be noted that FIG. 1 has been simplified for ease of explanation. For example, the 3D printer 100 in FIG. 1 may include additional components and devices that are not shown. In addition, the 3D printer 100 only provides one mechanical implementation of the present disclosure. For example, although the movable platform 114 is shown to move horizontally left and right, the 3D printer 100 may be vertically arranged such that the movable platform 114 moves vertically up and down. In another example, the movable platform 114 may be stationary and the dispenser 106, the first light source 110 and the second light source 112 may be moved over the build material 108.

Figure 3:
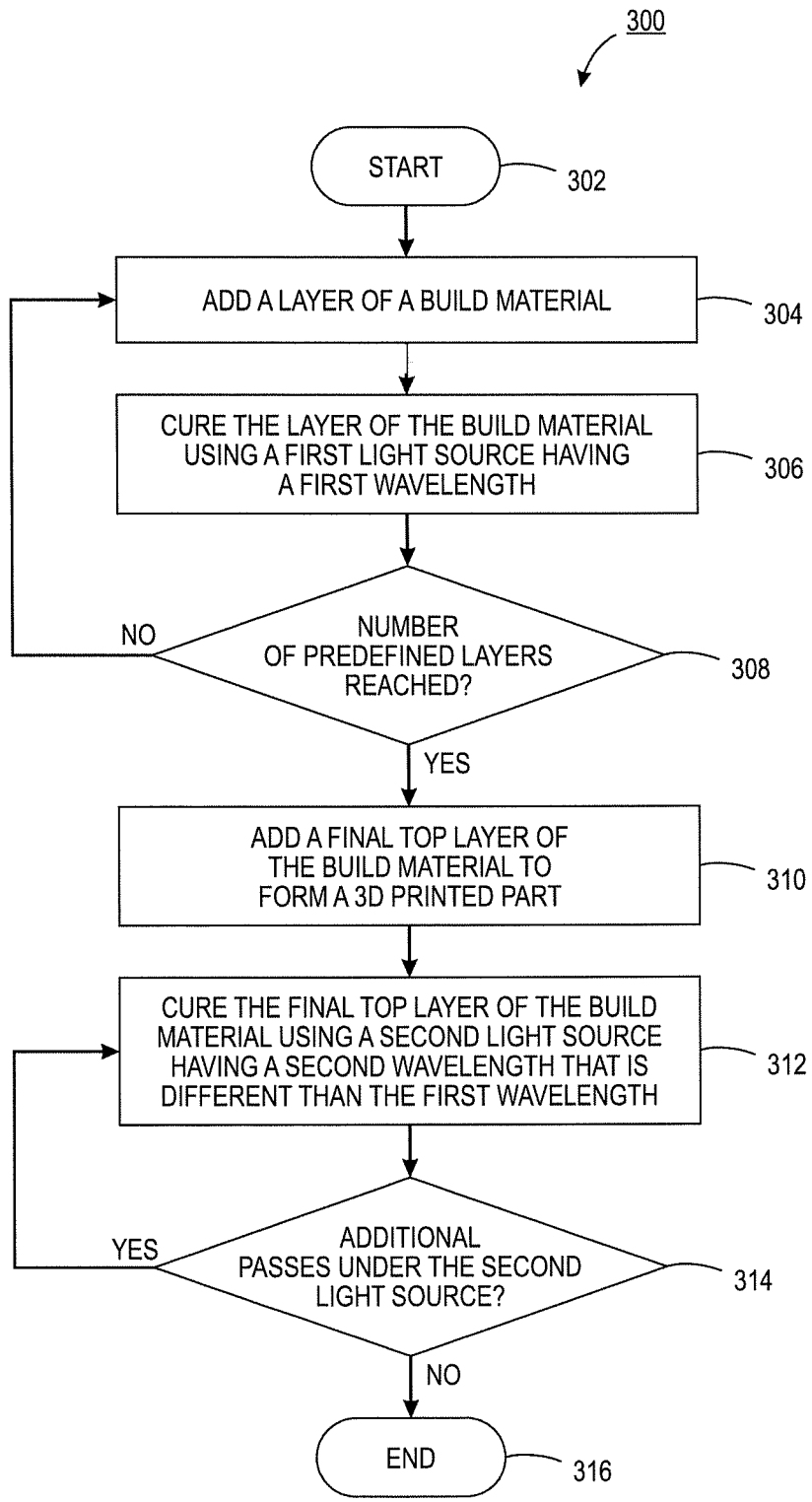
FIG. 3 illustrates a flowchart of an example method for curing a 3D printed part.
Figure 4:
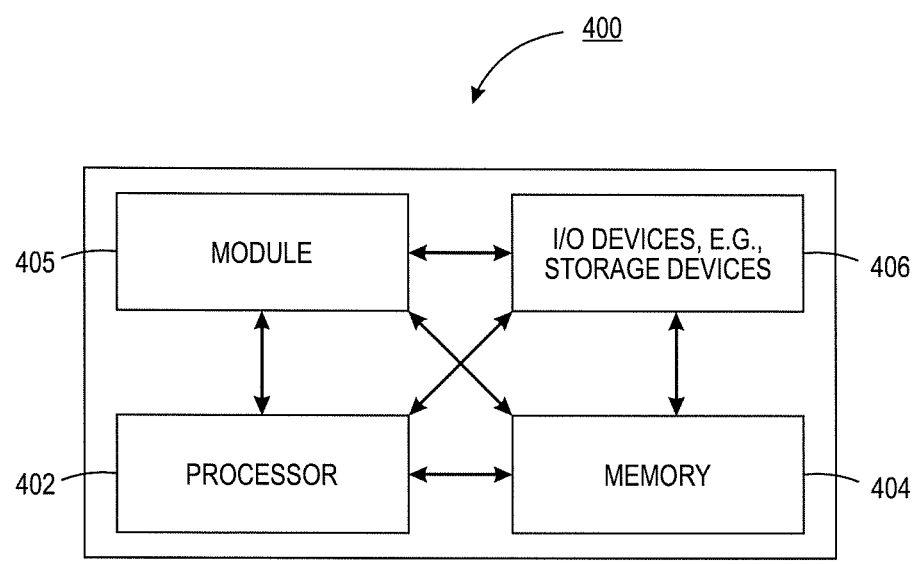
FIG. 4 illustrates a high-level block diagram of an example computer suitable for use in performing the functions described herein.

FIG. 3 illustrates a flowchart of an example method 300 for curing a 3D printed part. In one embodiment, one or more steps or operations of the method 300 may be performed by the 3D printer 100 or a computer that controls operation of the 3D printer 100 as illustrated in FIG. 4 and discussed below.

At block 302, the method 300 begins. At block 304, the method 300 adds a layer of a build material. The build material may be a curable material such as small particles of metal, plastic, polymers, or UV curable inks. The layer of the build material may be added by a dispenser or may be "printed" using a curable liquid or binder that is applied to a shape of the 3D printed part in a bed of the build material.

At block 306, the method 300 cures the layer of the build material using a first light source having a first wavelength. For example, the first light source may be a UV light source that operates between 390 nanometers (nm) to 400 nm. In one embodiment, the first light source may operate at 395 nm. In one embodiment, the first light source may operate at light intensities that are less than a full intensity level. For example, the first light source may operate at approximately 15 percent to 50 percent of the full intensity level.

At block 308, the method 300 determines if a number of predefined layers has been reached. In one embodiment, the number of predefined layers may be one less than a total number of layers. For example, if the 3D printed part has 20 layers, the number of predefined layers may be 19.

If the answer is no, then the method 300 may return to block 304 and blocks 304-306 may be repeated. If the answer to block 308 is yes, then the method 300 may proceed to block 310.

At block 310, the method 300 adds a final top layer of he build material to form the 3D printed part. It should be noted that the method 300 does not use a sacrificial layer in addition to the final top layer that is cured and removed. The final top layer may be the actual top layer of the 3D printed part.

At block 312, the method 300 cures the final top layer of the build material using a second light source having a second wavelength that is different than the first wavelength. For example, the second light source may be a UV light source that operates between 360 nm to 370 nm. In one embodiment, the second light source may operate at 365 nm. In one embodiment, the second light source may operate at light intensities that are less than a full intensity level. For example, the second light source may operate at approximately 15 percent to 50 percent of the full intensity level.

At block 314, the method 300 determines if additional passes under the second light source are needed. For example, some processes may use multiple passes under the second light source for the final top layer to ensure that the top layer is fully cured.

If the answer is yes, the method 300 may return to block 312 and blocks 312 and 314 may be repeated. If the answer to block 314 is no, then the method 300 may proceed to block 316.

Thus, the method 300 of the present disclosure provides a 3D printed part having a glossy finish. In addition, the method 300 does not use a sacrificial layer that is cured and removed to ensure full curing of the 3D printed part. Moreover, the method 300 uses a combination of different wavelengths of light at different layers to ensure full curing without using excess energy or light. This leads to a more efficient process that may also be cheaper due to less energy and material costs. At block 316, the method 300 ends.

It should be noted that the blocks in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

FIG. 4 depicts a high-level block diagram of a computer that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for curing a 3D printed part, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for curing a 3D printed part (e.g., a software program comprising computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for curing a 3D printed part (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for curing a three dimensional (3D) printed part, comprising:
    adding a layer of a build material, wherein the build material comprises an ultra violet (UV) curable ink;
    curing the layer of the build material using a first light source having a first wavelength, wherein the build material is only exposed to the first light source;
    repeating the adding and the curing using the first light source having the first wavelength for a predefined number of layers;
    adding a final top layer of the build material to form the 3D printed part, wherein the final top layer is a same build material as the build material of the predefined number of layers; and
    curing the final top layer of the build material using a second light source having a second wavelength that is different than the first wavelength, wherein the final top layer is only exposed to the second light source to provide a glossy finish on the final top layer.

2. The method of claim 1, wherein the first light source comprises an ultra violet (UV) light.

3. The method of claim 2, wherein the first wavelength comprises a wavelength between 390 nanometers (nm) and 400 nm.

4. The method of claim 3, wherein the first light source is powered at a less than full intensity level.

5. The method of claim 4, wherein the less than full intensity level comprises an intensity level of approximately 15 percent to 50 percent.

6. The method of claim 1, wherein the second light source comprises an ultra violet (UV) light.

7. The method of claim 6, wherein the second wavelength comprises a wavelength between 360 nanometers (nm) and 370 nm.

8. The method of claim 7, wherein the second light source is powered at a less than full intensity level.

9. The method of claim 8, wherein the less than full intensity level comprises an intensity level of approximately 15 percent to 50 percent.

10. The method of claim 1, comprising:
    repeating the curing the final top layer of the build material using the second light source for a plurality of passes.

11. A method for curing a three dimensional (3D) printed part, comprising:
    adding a layer of a ultra violet (UV) curable ink;
    curing the layer of the UV curable ink using a first UV light source at between approximately 390 nanometers (nm) to 400 nm, wherein the layer of the UV curable ink is only exposed to the first UV light source;
    repeating the adding and the curing at between approximately 390 nm to 400 nm for a predefined number of layers;
    adding a final top layer of the UV curable ink to form the 3D printed part, wherein the UV curable ink of the final top layer is a same UV curable ink as the UV curable ink of the predefined number of layers; and
    curing the final top layer of the UV curable ink using a second UV light source at between approximately 360 nm to 370 nm to provide a glossy finish on the final top layer of the UV curable ink, wherein the final top layer is only exposed to the second UV light source.

* * * * *